United States Patent
Kienzle et al.

(10) Patent No.: US 8,906,289 B2
(45) Date of Patent: Dec. 9, 2014

(54) METHOD FOR MANUFACTURING FRICTION DISKS WITH CERAMIC MATERIALS WITH IMPROVED FRICTION LAYER

(75) Inventors: Andreas Kienzle, Balgheim (DE); Ingrid Krätschmer, Biberbach (DE)

(73) Assignee: Audi, Ingolstadt (DE)

( * ) Notice: Subject to any disclaimer, the term of this patent is extended or adjusted under 35 U.S.C. 154(b) by 622 days.

(21) Appl. No.: 11/808,182

(22) Filed: Jun. 7, 2007

(65) Prior Publication Data

US 2007/0284773 A1    Dec. 13, 2007

(30) Foreign Application Priority Data

Jun. 8, 2006 (DE) .......................... 10 2006 026 549

(51) Int. Cl.
| | | |
|---|---|---|
| C04B 35/573 | (2006.01) | |
| C04B 35/626 | (2006.01) | |
| C04B 35/83 | (2006.01) | |
| C04B 37/00 | (2006.01) | |
| F16D 69/02 | (2006.01) | |

(52) U.S. Cl.
CPC ......... *C04B 35/62635* (2013.01); *C04B 35/573* (2013.01); *C04B 35/62695* (2013.01); *C04B 35/83* (2013.01); *C04B 37/008* (2013.01); *F16D 69/023* (2013.01); *C04B 2235/526* (2013.01); *C04B 2235/5272* (2013.01); *C04B 2235/5436* (2013.01); *C04B 2235/604* (2013.01); *C04B 2235/6562* (2013.01); *C04B 2235/94* (2013.01); *C04B 2237/363* (2013.01); *F16D 2200/0047* (2013.01)
USPC ............ 264/643; 264/29.1; 264/41; 264/126; 264/628

(58) Field of Classification Search
CPC ...... C04B 35/80; C04B 35/56; C04B 35/521; C04B 35/524; C04B 35/528; C04B 35/532
USPC ........... 264/29.1, 126, 41, 603, 682, 642, 643
See application file for complete search history.

(56) References Cited

U.S. PATENT DOCUMENTS

| | | | | |
|---|---|---|---|---|
| 5,294,460 | A * | 3/1994 | Tani et al. ..................... | 427/228 |
| 5,698,143 | A * | 12/1997 | Tani et al. ..................... | 264/29.1 |
| 6,030,913 | A * | 2/2000 | Heine et al. ..................... | 501/88 |
| 6,261,981 | B1 * | 7/2001 | Dietrich et al. .............. | 501/95.2 |
| 6,576,076 | B1 * | 6/2003 | Tani ........................... | 156/89.26 |
| 7,067,077 | B2 * | 6/2006 | Gray .............................. | 264/29.2 |
| 7,105,224 | B2 * | 9/2006 | Krell et al. ..................... | 428/332 |
| 2003/0106751 | A1 * | 6/2003 | Bauer et al. ............. | 188/218 XL |
| 2005/0037914 | A1 * | 2/2005 | Gahr et al. ....................... | 501/88 |
| 2006/0012061 | A1 * | 1/2006 | Hirata et al. .................. | 264/29.2 |
| 2006/0197063 | A1 * | 9/2006 | Tennison et al. .............. | 252/500 |

FOREIGN PATENT DOCUMENTS

| | | |
|---|---|---|
| DE | 44 38 458 A1 | 5/1996 |
| DE | 197 11 829 C1 | 9/1998 |
| DE | 195 10 032 C2 | 10/1999 |
| DE | 198 23 223 A1 | 12/1999 |
| DE | 100 48 012 A1 | 4/2002 |
| DE | 100 60 566 A1 | 6/2002 |
| EP | 0 517 449 A2 | 12/1992 |
| EP | 1 464 634 A2 | 10/2004 |
| EP | 1 544 184 A1 | 6/2005 |
| EP | 1 640 633 A1 | 3/2006 |
| EP | 1 783 395 A2 | 5/2007 |
| JP | 11-217267 * | 8/1999 |
| WO | WO 99/41069 | 8/1999 |
| WO | WO 2005/115945 A1 | 12/2005 |

OTHER PUBLICATIONS http://www.merriam-webster.com/dictionary/laminating.*
Atomic Composition of® Bakelite: http://physics.nist.gov/cgi-bin/Star/compos.pl?matno=112.*
Atomic Composition of PVA: http://physics.nist.gov/cgi-bin/Star/compos.pl?matno=230.*
JP 11-217267 English Abstract, Aug. 1999.*

* cited by examiner

Primary Examiner — Richard Crispino
Assistant Examiner — Elizabeth Royston
(74) Attorney, Agent, or Firm — Novak Druce Connolly Bove + Quigg LLP

(57) ABSTRACT

Method for manufacturing a friction disk including preparing a mixture including a carbide-forming element having an average particle size ≤2,000 μm, a resin, optionally a binder, and optionally fine carbon, and/or short carbon fibers; forming the mixture at ≤ to 280° C. to produce a molded body; heating the molded body to approximately 750° C. to approximately 1300° C. to form a porous carbon body including a carbon residue; heating the porous carbon body to a temperature above the melting point of the carbide-forming element thereby reacting the carbide-forming element with at least a portion of the carbon residue to yield an alveolar structure; infiltrating the alveolar structure with silicon at a temperature above the melting point of silicon thereby filling at least one pore of the alveolar structure with silicon and reacting the silicon with an amount of unreacted carbon residue to form silicon carbide; and obtaining a friction disk.

21 Claims, No Drawings

METHOD FOR MANUFACTURING FRICTION DISKS WITH CERAMIC MATERIALS WITH IMPROVED FRICTION LAYER

CROSS-REFERENCE TO RELATED APPLICATIONS

This application claims priority from German Application No. 102006026549.1, filed Jun. 8, 2006, hereby incorporated by reference in its entirety.

The invention relates to a method for manufacturing friction disks with ceramic materials with an improved friction layer, and their use as brake disks or clutch driving disks.

Ceramic materials compared to metals are characterized among other things by high hardness, thermal stability and corrosion resistance. The lower strength and higher fracture sensitivity of ceramic materials can be compensated by reinforcing fibers contained in ceramic composites. The reinforcing fibers contained in the ceramic materials as a dispersed phase act as crack branching and crack deflection sites; in this connection the mechanical stresses can be distributed over a larger volumetric element and can be reduced below the (local) fracture strength.

On the one hand, these fibers which preferably consist of carbon, with good binding to the matrix of the ceramic material, cause a major increase of the stiffness (modulus) and strength of the material, on the other hand these fibers can act as oxidation paths, since fibers of carbon at a high operating temperature are oxidatively damaged, and "burned" fibers can form channels along which oxygen can travel into the workpiece and thus can cause further damage. Due to "burned" fibers in an application as a brake disk, in addition the surface of the brake disk becomes rougher; this causes stronger abrasive wear of the brake linings.

Brake disks of ceramic composite materials compared to brake disks of metal for example are characterized among other things by lower density, lower wear and higher deceleration performance.

The prior art (DE 100 48 012 A1) discloses such carbon-ceramic brake disks which have a multilayer structure of carrier bodies and friction layers, and in which the carrier body is reinforced with long carbon fibers (average length between 4 mm and 20 mm), and the friction layers have short carbon fibers (average length between 0.5 mm and 8 mm) as reinforcing means. Reinforcement of the material by carbon fibers is however not essential to the function of the friction layer; but the fiber content does affect the formation of crack structures and the coefficient of thermal expansion.

In studies underlying this invention, it was found that under thermal load the carbon fibers located on the surface preferably oxidize and therefore form imperfections and roughnesses. Therefore the object of the invention is to at least partially replace carbon fibers as reinforcing agents for ceramic materials for use in friction layers in order to improve the oxidative and thermal stability of these materials.

It was found that to produce the friction layers a mixture of fine silicon and/or fine particles of other carbide-forming elements with a resin in particulate form and optionally fine carbon and optionally short carbon fibers can be used, it being possible to reduce the proportion of fibers by mass to a maximum 50% of the raw materials used to produce the friction layer, or reinforcing fibers can even be completely dispensed with.

"Fine particles" or "fine" designate those particles which have an average particle size of up to 2000 μm, especially 350 μm, preferably from 5 μm to 250 μm, and especially from 10 μm to 150 μm. These resins in particulate form satisfy the same indicated particle size distribution. In the case of using silicon preferably a grain size (particle diameter) in the range from 50 μm to 2 mm is used.

The short carbon fibers are present preferably in the form of bundles, approx. 500 to approx. 20,000 individual fibers forming such a bundle. The length of the short fibers is 0.001 mm to 30 mm, preferably 0.1 mm to 15 mm, especially preferably 0.2 mm to 5 mm.

Therefore the invention relates to a method for manufacturing friction disks from ceramic materials with at least one friction layer with a matrix containing silicon carbide, silicon and carbon, and which furthermore optionally contain a dispersed phase of bundles of short carbon fibers, the proportion of fibers by mass being at most 50% of the masses of all those for production of the materials for the friction layer, the friction layers being produced by first a mixture of a fine silicon and/or fine particles of other carbide-forming elements being prepared with at least one other component selected from a resin in particulate form and a binder selected from resins, pitches and mixtures of them. It is possible to use binders in powdered form or in liquid or viscous form in this connection. Here preferably a resin in particulate form with a powdered pitch or a powdered mixture of pitch and resins can be used. Preferred resins are phenolic resins and furan resins. Another preferred embodiment is the use of particulate resin, especially phenolic resins and furan resins, with liquid or viscous phenolic resins or pitches. Dry mixtures can be produced in a stirrer, liquid or pasty mixtures in a kneading machine. A dry mixture must be deaerated before or during shaping, for liquid or pasty mixtures their already being deaerated during the mixing process without further help. The molded body produced by compaction from this mixture should preferably have a porosity of at most 15%, measured as a volumetric proportion of pores in the molded body. To produce friction disks, these mixtures are pressed and hardened into cylindrical annular disks at temperatures of up to 280° C., preferably up to 220° C., especially up to 180° C. The molded bodies obtained in this way are further processed into friction disks individually or in combination with a likewise cylindrical carrier body.

For this purpose, in a first alternative the molded bodies are heated to a temperature of approx. 750° C. to approx. 1300° C., preferably from 900° C. to 1200° C. with the exclusion of oxidizing agents, the binders decomposing with the formation of a carbon residue. The porous carbon body which has formed contains the fine silicon originally contained in the mixture or the fine particles of other carbide-forming elements originally contained in the mixture. The carbon reside which has formed essentially retains the shape which the binder has assumed in the wedges and regions between the fine particles of silicon and other carbide-forming elements. As heating continues to above the melting point of the silicon or the other carbide-forming elements, they react with the carbon which has formed and yield an alveolar structure with a skeleton of formed carbides and unreacted residues of carbon or carbide-forming elements. This alveolar structure is then infiltrated with additional silicon at a temperature above its melting point, at least some of the pores of the structure being filled with elementary silicon, and unreacted carbon of the alveolar structure reacts with silicon to form silicon carbide. This yields a molded body containing silicon carbide, silicon and residues of unreacted carbon.

In the second alternative, the porous carbon bodies, produced as described above, are placed on a previously separately produced carrier body of carbon reinforced with fibers preferably of carbon on its two ring-shaped cover surfaces and optionally fixed, for example by surface or spot cementing or pinning together. These combinations are then heated and infiltrated with liquid silicon, in the conventionally manner silicon carbide being formed from the silicon and carbon of the applied porous carbon body and the carrier body.

Preferably the carbide forming element is silicon or a mixture containing it; the matrix then contains silicon carbide, optionally in a mixture with other carbides. Other carbide-forming elements which can be used for the invention preferably in mixture with silicon are chromium, molybdenum, tungsten, iron, cobalt, nickel, copper, vanadium, niobium, tantalum, titanium, zirconium, and hafnium.

The proportion of fine, carbide-forming elements by mass in the mixture for producing the friction layer is 20% to 70%, preferably 30% to 65%, and especially preferably 35% to 60%. Accordingly the proportion of binder and particulate resins by mass in the mixture is from 30% to 80%, preferably from 35% to 70%, and especially preferably 40% to 65%. The mixture optionally contains a proportion of up to 50% of fine carbon by mass and likewise optionally a proportion of up to 50% of short carbon fibers by mass.

Preferably the binders are substances which when heated with the exclusion of oxidizing agents to temperatures from 750° C. to 1300° C. yield a carbon residue as high as possible, for example phenolic resins, furan resins, aromatic polymers such as aromatic polyesters, polyamides, or polyimides. Pitches are likewise suited, also in a mixture with the indicated polymers.

Preferably carbon fibers are used in smaller proportions by mass than the maximum of 50%, ranges for the proportion by mass of a maximum 30%, and especially a maximum of 10% being especially preferred.

The friction layers produced according to the invention are used especially as brake disks and clutch driving disks.

The invention will be detailed by the following examples.

EXAMPLE 1

Production of a Mixture for the Friction Layer 500 g of a silicon granulate (®Silgrain, Elkem Co., particle diameter up to 70 μm) were premixed with 400 g of a dry phenolic resin powder (®Bakelite 223, Hexion Co.) in an intensive mixer from Eirich at 300/min$^{-1}$. Then, at an increased rpm of 1200/min$^{-1}$ within 5 minutes 300 ml of an aqueous solution of polyvinyl alcohol (mass concentration in the solution: 5 g in 100 g) were added. A lumpy mass referred to as a "granulate" forms. It is dried in a drying cabinet to a residual moisture of approx. 2.5% (remaining mass proportion of water in the granulate).

EXAMPLE 2

Production of a Molded Body for a Friction Layer 350 g of the dried granulate from example 1 were placed in a cylindrical press mold with an outside diameter of 350 mm and a diameter of the inner cylinder of 180 mm to the same height, and pressed for ten minutes at a pressure of 170 MPa and a temperature of 150° C. After curing, a cylindrical annular disk with an outside diameter of 350 mm and an inside diameter of 180 mm, 3 mm thick, was obtained.

EXAMPLE 3

Production of a Carrier Body

Coated short graphite fibers were produced according to the description in patent application DE 197 10 105 A1. With these fibers a press body was prepared from 25 kg of a fraction of the indicated fibers with a length range from 1 mm to 2 mm, 6 kg of a fraction of the indicated fibers with a length range of up to 0.5 mm, and 4 kg of a fiber fraction with a length range from 0.5 mm to 1 mm, and 10 kg of a phenolic resin (®Norsophen 1203), this mixture having been homogenized in an intensive mixer from Eirich for eight minutes at an rpm of 500 min$^{-1}$. 3.2 kg of the press body produced in this way were placed in a mold in the form of a cylindrical ring with an outside diameter of 360 mm and an inside diameter of 160 mm. Plastic cores with shape of the desired cooling channels were inserted into the mold during filling. In a hot flow press at a pressure of 2.5 N/mm$^2$ and a temperature of up to 180° C. the mass was hardened into a green compact which was then carbonized at approx. 900° C. with the exclusion of oxidizing agents and with the formation of a porous, fiber-reinforced carbon body. The body experiences a mass loss of 12.5% relative to the charge mass. The body was machined to the selected final geometry.

EXAMPLE 4

Production of a Composite Disk from a Carbonized Carrier Body and Two Cylindrical Pressed Slabs According to Example 2

Two pressed slabs according to example 2 were heated in a furnace at a heating rate of 2 K/min under a protective gas (argon) to a temperature of 900° C., the hardened phenolic resin portions having been converted to amorphous carbon. These disks were fixed after cooling and removal from the furnace onto each of the cover surface of a cylindrical carrier body according to Example 3 with a phenolic resin adhesive. By hardening in a press at 140° C. and a pressure of 100 MPa, a composite disk with a mass of approx. 2200 g was produced. The disk was placed in a graphite crucible on three porous carbon wicks, the crucible was filled with 2800 g of a silicon granulate (grain size up to 2 mm) and heated in a vacuum furnace to a temperature of approx. 1700° C. at reduced pressure (approx. 5 mbar). The heat-up rates were 5 K/min to 1420° C., and 2 K/min up to 1700° C.; the silicon melted starting at 1420° C. and penetrated via the open pores into the composite body where it reacted with carbon to form SiC. After cooling, the C/SiC component which had formed was removed and optionally ground on the free cover surfaces.

The invention claimed is:

1. A method for manufacturing a friction disk comprising preparing a mixture consisting of from 20 to 70% by mass based on the total mass of the mixture of a carbide-forming element having an average particle size less than or equal to 2,000 μm, from 30 to 80% by mass based on the total mass of the mixture of a resin having an average particle size less than or equal to 2,000 μm, and optionally a binder selected from the group consisting of a binder resin, a pitch, and combinations thereof, and from 0 to 50% by mass based on the total mass of the mixture of a component selected from the group consisting of fine carbon short carbon fibers, and combinations thereof;

forming the mixture at a temperature of less than or equal to 280° C. to produce a molded body consisting of the components of the mixture and having a porosity of less than or equal to 15% measured as a volumetric proportion of pores in the molded body, wherein the forming step comprises compacting the mixture;

heating the molded body to a temperature of from approximately 750° C. to approximately 1300° C. to form a porous carbon body comprising a carbon residue;

heating the porous carbon body to a temperature above the melting point of the carbide forming element thereby reacting the carbide-forming element with at least a portion of the carbon residue to yield an alveolar structure;

infiltrating the alveolar structure with silicon at a temperature above the melting point of silicon thereby filling at least one pore of the alveolar structure with silicon and reacting the silicon with an amount of unreacted carbon residue to form silicon carbide; and obtaining a friction disk, wherein the friction disk is one selected from the group consisting of brake disks and clutch driving disks.

2. The method according to claim 1, wherein, in the heating step, the molded body is heated to a temperature of from approximately 900° C. to approximately 1200° C.

3. The method according to claim 1, wherein, in the heating step, the heating is conducted without oxidizing agents.

4. The method according to claim 1, wherein the carbide-forming element is selected from the group consisting of silicon, chromium, molybdenum, tungsten, iron, cobalt, nickel, copper, vanadium, niobium, tantalum, titanium, zirconium, and hafnium.

5. The method according to claim 1, wherein the average particle size of the carbide forming element is from 5 to 350 µm.

6. The method according to claim 1, wherein the average particle size of the resin is from 5 to 350 µm.

7. The method according to claim 1, wherein the resin is selected from the group consisting of a phenolic resin, and a furan resin.

8. The method according to claim 1, wherein the short carbon fibers are in the form of bundles, having approximately 500 to approximately 20,000 individual fibers per bundle.

9. The method according to claim 1, wherein the short carbon fibers have a length of from 0.001 mm to 30 mm.

10. The method according to claim 1, wherein the mixture comprises the binder, and the binder is a substance that yields a carbon residue when heated without oxidizing agents to a temperature of from 750 to 1300° C.

11. The method according to claim 1, wherein the mixture comprises the binder, and the binder is in powdered form.

12. The method according to claim 1, wherein the mixture comprises the binder, and the binder is in liquid or viscous form.

13. The method according to claim 1, wherein the mixture comprises the binder, and the resin and the binder resin are the same.

14. The method according to claim 1, wherein the mixture comprises the binder, and the resin and the binder resin are different.

15. The method according to claim 1, wherein the mixture comprises the binder, and the binder resin is selected from the group consisting of phenolic resin, furan resin, aromatic polymer, pitch, and combinations thereof.

16. The method according to claim 1, wherein the mixture is prepared in an apparatus selected from the group consisting of a stirrer, and a kneader.

17. The method according to claim 1, wherein the molded body is in the form of an cylindrical annular disk.

18. The method according to claim 1, wherein the forming step takes place at temperature of less than or equal to 180° C.

19. The method according to claim 1, wherein the short carbon fibers have a length of from 0.001 mm to 0.2 mm.

20. The method according to claim 1, wherein the mixture contains 0 wt. % short carbon fibers.

21. A method for manufacturing a friction disk comprising preparing a mixture consisting essentially of:

from 20 to 70% by mass based on the total mass of the mixture of a carbide-forming element having an average particle size less than or equal to 2,000 µm, from 30 to 80% by mass based on the total mass of the mixture of a resin having an average particle size less than or equal to 2,000 µm, and optionally a binder selected from the group consisting of a binder resin, a pitch, and combinations thereof, and from 0 to 50% by mass based on the total mass of the mixture of a component selected from the group consisting of fine carbon, short carbon fibers, and combinations thereof;

forming the mixture at a temperature of less than or equal to 280° C. to produce a molded body consisting of the components of the mixture and having a porosity of less than or equal to 15%, measured as a volumetric proportion of pores in the molded body, wherein the forming step comprises compacting the mixture;

heating the molded body to a temperature of from approximately 750° C. to approximately 1300° C. to form a porous carbon body comprising a carbon residue;

forming a composite body comprising the porous carbon body and a carrier body, the carrier body comprising carbon reinforced with fibers;

infiltrating the composite body with silicon at a temperature above the melting point of silicon thereby reacting the silicon with an amount of the carbon residue and/or an amount of carbon from the carrier body to form silicon carbide; and obtaining a friction disk, wherein the friction disk is one selected from the group consisting of brake disks and clutch driving disks.

* * * * *